United States Patent
Reni et al.

[15] 3,674,845
[45] July 4, 1972

[54] METHOD OF PRODUCING AROMATIC CARBOXYLIC ACIDS FROM ALKYLBENZENES

[72] Inventors: Cesare Reni, Busto Arsizio; Giorgio Gualdi, Verona; Luigi Lugo, Milan, all of Italy

[73] Assignee: Societa' Italiana Resine S.p.A., Milan, Italy

[22] Filed: June 30, 1970

[21] Appl. No.: 51,385

[30] Foreign Application Priority Data

July 7, 1969 Italy...................................19284 A/69

[52] U.S. Cl......................260/524 R, 252/429 R, 252/431 C
[51] Int. Cl..........................................................C07c 63/02
[58] Field of Search ...............................................260/524 R

[56] References Cited

UNITED STATES PATENTS

3,162,683  12/1964  Jones et al. ..............................260/524
3,313,849  4/1967  List et al. ................................260/524

FOREIGN PATENTS OR APPLICATIONS

19,247  8/1969  Japan....................................260/524

Primary Examiner—Lorraine A. Weinberger
Assistant Examiner—R. S. Weissberg
Attorney—Sughrue, Rothwell, Mion, Zinn & Macpeak

[57] ABSTRACT

A process for the continuous production of aromatic carboxylic acids by the oxidation of alkyl benzenes in an aliphatic carboxylic acid environment and in the presence of catalysts consisting of heavy metal salts in which an activator selected from chlorides and bromides of chloroacetic and bromoacetic acids is present in the reaction mixture.

10 Claims, No Drawings

METHOD OF PRODUCING AROMATIC CARBOXYLIC ACIDS FROM ALKYLBENZENES

This invention relates to an improved method of producing aromatic carboxylic acids by the oxidation of alkyl benzenes in the presence of catalysts and in a carboxylic acid environment.

There are various known methods of producing carboxylic acids by the catalytic oxidation of alkyl benzenes in an inert liquid environment.

According to these methods, xylenes, for example, are converted into the corresponding phthalic acids, toluene into benzoic acid and p-diisopropyl benzene into terephthalic acid.

The products thus obtained are extremely useful to industry.

Terephthalic acid, for example, normally in diester form, is converted, in conjunction with glycols, into polymers utilized in the production of yarns.

In processes in which alkyl benzenes are oxidized to form corresponding carboxylic acids in an inert liquid environment, use is made of reaction catalysts consisting of salts of heavy metals and activators consisting of bromine and derivatives thereof.

The catalysts normally used are salts of cobalt and manganese; the activators generally consist of alkali metal bromides, the bromides of heavy metals or hydrobromic acid.

The oxidizing processes referred to, however, have the disadvantage of being based on relatively low rates of conversion and selectivity, so that unconverted material, and more particularly only partially oxidized material, is recovered at the end of the reaction.

Thus, in some cases, the unconverted substances are recovered in part by treatment with nitric acid, for example.

In this way, however, the oxidation process becomes very burdensome, with obvious economic disadvantages.

It has now been discovered that it is possible to improve the yield and selectivity in the oxidation of alkyl benzenes to form the corresponding carboxylic acids, in processes carried out in an inert liquid environment in the presence of heavy metal salts, by using chlorides and bromides of chloro and bromo carboxylic acids as the reaction activators and by keeping the concentration of oxidizing gas as constant as possible in the reaction environment.

In more precise terms, in accordance with the process now proposed, an alkyl benzene or a mixture of alkyl benzenes is subjected to oxidation in the presence of an aliphatic carboxylic acid that is liquid in the conditions of reaction.

The carboxylic acid preferred is acetic acid, used in quantities of from 1 to 10 parts by weight to 1 part by weight of alkyl benzene.

The catalysts for the oxidation reaction consist of salts, normally acetates or halides, of cobalt and manganese, in quantities of from 0.1 to 5.0 parts by weight in every 100 parts by weight of the aromatic alkyl hydrocarbon being subjected to oxidation.

As already stated, the purposes of the present invention are achieved by the use of bromides and chlorides of chloro and bromo carboxylic acids as reaction activators.

To be more precise, the halogen derivatives of acetic acid are used in the preferred form in quantities such that the content of chlorine or bromine lies within the range $1 \times 10^{-3}$ to $100 \times 10^{-3}$ gram-atoms per mol of the hydrocarbon being subjected to oxidation.

In practice, the activators with which the invention is concerned are the bromides and/or chlorides of chloroacetic acid mixed with chlorides and/or bromides of bromoacetic acid.

By the use of these activators, it is possible to obtain rates of conversion of alkyl benzenes into the corresponding carboxylic acids in excess of 90% when this is carried out at temperatures of 150° to 220° C. and pressures of up to 30 atmospheres and the concentration of oxidizing gas in the reaction environment is kept as constant as possible.

More specifically, the reaction is carried out continuously in elongated reaction vessels, only one fraction of oxidizing gas being admitted to the base of the vessel, while the remainder of the gas is passed to at least one point along the body of the vessel.

In a recommended form of the invention, air is fed to the base of the reaction vessel in quantities such that the oxygen does not exceed 50% in relation to what is theoretically required for oxidation of the aromatic alkyl hydrocarbons to the corresponding carboxylic acids.

Part-way along the body of the vessel, on the other hand, oxygen or a gas containing 90% or so of oxygen is admitted in quantities such as to complete the oxidation reaction, admission being made at at least one point and preferably at two to four separate points.

In any case, the conditions should preferably be such as to ensure that the gases discharged from the reaction vessel contain from 1 to 5% of oxygen.

Finally, the alkyl benzene hydrocarbon and carboxylic acid, together with the catalysts and reaction activators, are fed continuously to the top of the vessel, while the reaction products are collected from the base.

The process here proposed is particularly applicable to the oxidation of xylenes to the corresponding phthalic acids, especially p-xylene to terephthalic acid, to obtain reaction products not requiring complicated methods of purification for the purposes for which they are normally intended.

It is also possible to oxidize other types of alkyl aromatic hydrocarbons, such as, for example, p-diisopropyl benzene, to form terephthalic acid with high conversion rates.

EXAMPLE 1

An elongated tubular reaction vessel of about 15 liters capacity was used, equipped with agitation, heat-exchange jacket and arrangements for introducing the reagents and removing the reaction products.

The top of the vessel was fitted with facilities for condensing and re-cycling condensable products.

The following were admitted continuously to the top of the vessel: p-xylene, 1 kg./hour; acetic acid (98% conc.), 6 kg./hour; and 22 g./hour of manganese acetate and 22 g./hour of cobalt acetate, these salts being in the form of concentrated aqueous solutions.

Dichloroacetic acid chloride and monobromoacetic acid bromide were admitted to the top of the reaction vessel at the rate of 40 g./hour and 50 g./hour respectively.

Air was fed to the base of the vessel at the rate of approximately 1,400 N. liters/hour and commercial oxygen (95%) was admitted at two points situated about one-third and two-thirds of the way up the vessel, the feed rate in each case being 200 N. liters/hour.

The working pressure and temperature were 14 atmospheres and 200° C.

The reaction products were removed continuously from the base of the vessel and from these the terephthalic acid recovered was washed with water and acetic acid.

By this means, 1.45 kg./hour of purified terephthalic acid was obtained.

EXAMPLE 2 (COMPARATIVE)

The experiment described in Example 1 was repeated, but without the admission of halogen derivatives of acetic acid.

The bromine was admitted in quantities equivalent to those used in Example 1, in the form of metallic bromides, in addition to which the whole of the oxidizing gas was fed to the base of the reaction vessel.

By this means, 1.3 kg./hour of fairly impure terephthalic acid was obtained.

What we claim is:

1. In a process for the continuous production of aromatic carboxylic acids comprising continuously oxidizing, in a reaction zone, an alkyl benzene or mixtures thereof in the presence of an aliphatic carboxylic acid reaction solvent, said aliphatic carboxylic acid being liquid under the reaction conditions existing in said reaction zone, employing a catalytic amount of a cobalt or manganese salt catalyst and an activator therefor, collecting the reaction products from the reaction zone and separating therefrom the corresponding aromatic carboxylic acid product, the improvement comprising;

a. introducing said alkyl benzene, aliphatic carboxylic acid, catalyst and an activating amount of an activator selected only from the group consisting of bromides and chlorides of chloroacetic and bromoacetic acids to the top of an elongated tubular reaction vessel;
b. introducing air to the base of said reaction vessel in an amount sufficient to provide an oxygen content in said reaction vessel of not more than 50% of the oxygen theoretically required for oxidation;
c. introducing the remaining necessary oxygen, in the form of oxygen or a gas containing more than 90% molecular oxygen, to at least one point along the reaction vessel, to maintain the concentration of oxygen in said reaction vessel substantially constant; and
d. conducting the reaction at a temperature of from about 150° to 220° C and at a pressure of up to 30 atmospheres.

2. The process as claimed in claim 1, wherein the aliphatic carboxylic acid used is acetic acid in the proportion of from 1 to 10 parts by weight to 1 part by weight of alkyl benzene.

3. The process as claimed in claim 1, wherein the salt is an acetate or a halide.

4. The process as claimed in claim 1, wherein the catalytic salts are used in proportions of from 0.1 to 5.0 parts by weight to every 100 parts by weight of the alkyl benzene being subjected to oxidation.

5. The process as claimed in claim 1, wherein said activator is present in said reaction vessel in an amount sufficient to provide a bromine or chlorine content of from 0.001 to 0.1 gram-atoms of bromine or chlorine per mole of said alkyl benzene.

6. The process as claimed in claim 1 where in the reaction conditions are such as to provide an oxygen content in the gases discharged from the top of the reaction vessel of from 1 to 5%.

7. The process as claimed in claim 1 wherein said alkyl benzene is xylene, and wherein the corresponding phthalic acid is produced.

8. The process as claimed in claim 7 wherein said xylene is p-xylene and wherein the product aromatic carboxylic acid is terephthalic acid.

9. The process as claimed in claim 1 wherein said alkyl benzene is p-diisopropyl benzene and wherein the product aromatic carboxylic acid is terephthalic acid.

10. In a process for the continuous production of terephthalic acid comprising continuously oxidizing, in a reaction zone, p-xylene in the presence of acetic acid as a reaction solvent, in an amount of from about 1 to 10 parts by weight per one part by weight of said p-xylene, employing a catalyst selected from the group consisting of the acetates and halides of cobalt and manganese in an amount of from about 0.1 to 5 parts by weight per 100 parts by weight of said p-xylene, and an activator for said catalyst, collecting the reaction products from the bottom of the reaction zone and separating therefrom said product terephthalic acid, the improvement comprising:

a. introducing said p-xylene, acetic acid, catalyst and an activator selected only from the group consisting of bromides and chlorides of chloroacetic and bromoacetic acids to the top of an elongated tubular reaction vessel, the amount of activator fed to said reaction vessel being sufficient to provide, in said reaction vessel, a bromine or chlorine content of from 0.001 to 0.1 gram-atoms of bromine or chlorine per mole of said p-xylene;
b. introducing air to the base of said reaction vessel in an amount sufficient to provide an oxygen content in said reaction vessel of not more than 50% of the oxygen theoretically required for oxidation;
c. introducing the remaining necessary oxygen, in the form of oxygen or a gas containing more than 90% molecular oxygen, to at least one point along the reaction vessel, to maintain the concentration of oxygen in said reaction vessel substantially constant; and
d. conducting the reaction at a temperature of from about 150° to 220° C and at a pressure of up to 30 atmospheres.

* * * * *